United States Patent
Zellner et al.

(10) Patent No.: US 7,360,692 B2
(45) Date of Patent: Apr. 22, 2008

(54) CREATION OF CUSTOMIZED TRANSACTIONAL CARDS

(75) Inventors: Samuel Zellner, Dunwoody, GA (US); Elizabeth Wagner, Atlanta, GA (US); Steven Tischer, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 11/428,378

(22) Filed: Jun. 30, 2006

(65) Prior Publication Data

US 2008/0000965 A1 Jan. 3, 2008

(51) Int. Cl.
*G06K 5/00* (2006.01)

(52) U.S. Cl. ............... 235/380; 235/385; 705/41; 705/44

(58) Field of Classification Search ........... 235/380, 235/381; 705/41
See application file for complete search history.

(56) References Cited

U.S. PATENT DOCUMENTS

| | | | |
|---|---|---|---|
| 5,412,192 A | 5/1995 | Hoss | |
| 5,746,451 A * | 5/1998 | Weyer | 283/65 |
| 6,016,225 A | 1/2000 | Anderson | |
| 6,068,183 A | 5/2000 | Freeman | |
| 6,747,930 B1 * | 6/2004 | Weldon et al. | 369/53.21 |
| 2002/0065712 A1 * | 5/2002 | Kawan | 705/14 |
| 2005/0040240 A1 * | 2/2005 | Jones et al. | 235/487 |
| 2005/0167487 A1 * | 8/2005 | Conlon et al. | 235/380 |
| 2006/0283957 A1 | 12/2006 | Blumenfeld | |

OTHER PUBLICATIONS

Japan's First Scented Payment Card JCB Linda Sweet. JCB Corporate. 2005. <http://www.jcbcorporate.com/english/news/20051208.html>.*

* cited by examiner

*Primary Examiner*—Michael G. Lee
*Assistant Examiner*—Allyson N Trail
(74) *Attorney, Agent, or Firm*—Withers & Keys, LLC

(57) ABSTRACT

Customized transactional cards are created in one of various ways. The card holder may obtain a blank transactional card already having an encoded account number, create a customized design, and then apply the customized design to the blank transaction card such as by printing the design onto a label to be applied to the blank transactional card or directly onto the card. The card holder may obtain a blank transactional card which has not yet been authorized with an account number, create a customized design, apply the customized design to the transactional card, and at some point send the transactional card to the card issuer where it can be authorized by having an account number applied to it and then returned to the card holder. The card holder may access a web site to create a customized design and then the card issuer creates the transactional card according to the customized design and sends the transactional card having an encoded account number to the card holder.

3 Claims, 4 Drawing Sheets

CREATION OF CUSTOMIZED TRANSACTIONAL CARDS

TECHNICAL FIELD

The embodiments described herein are related to transactional cards such as credit cards and debit cards. More particularly, the present invention is related to the creation of customized transactional cards.

BACKGROUND

Transactional cards such as credit cards and debit cards are carried by many individuals. Conventionally, such transactional cards contain a machine-readable element such as a bar code or a magnetic strip that has an account number encoded thereon. The transactional cards typically include the account number in visible, raised numerals and may also include the name of the card holder. Other text may also be included such as the name of the card issuer and the regulations for use.

Transactional cards have conventionally been very plain, and the card holder has been given a standard card having only a standard design used by the card issuer, if any. To address this, some card issuers have offered a selection of standard designs to choose from. However, the card holder has been given no opportunity to create a truly custom design to apply to the transactional card.

SUMMARY

Exemplary embodiments address these issues and others by providing card holders with the ability to create custom designs for transactional cards. For example, the card holder may be able to use a computer program to create a custom design and then apply the design to a transactional card such as by printing a label to apply to a blank portion of the transaction card of by printing directly onto the blank portion. As another example, the card holder may utilize a web site to create a custom design, and the card issuer may then manufacture the transactional card according to the custom design.

One embodiment a method of creating a customized transactional card that involves obtaining a transactional card including account information, the transactional card being at least partially blank. The method further involves accessing a customized design created by a card holder for the at least partially blank transactional card. Additionally, the method involves placing the customized design onto the at least partially blank transactional card to cover at least a portion of the transactional card that is blank to create a customized transactional card.

Another embodiment is a method of creating a customized transactional card that involves receiving data files from a card holder, the data files containing customized design features selected by the card holder. The method further involves constructing the transactional card in accordance with the selected design features and providing a machine-readable element having account information present on the transactional card.

Another embodiment is a transactional card that includes a body having a first side and a second side. A machine-readable element is affixed to the body and has an account number present thereon. At least one design element is integrated onto the first side of the body, wherein the at least one design element is created by a card holder having an account to which the account number is associated.

DETAILED DESCRIPTION

Exemplary embodiments provide for customized transactional cards. According to one or more embodiments, card holders can choose from various design options including providing their own images for inclusion within the card design. The various embodiments provide for the card holder to produce the customized card from a blank or submit design data to a card issuer where the card is then produced in accordance with the design data.

Figure 1:
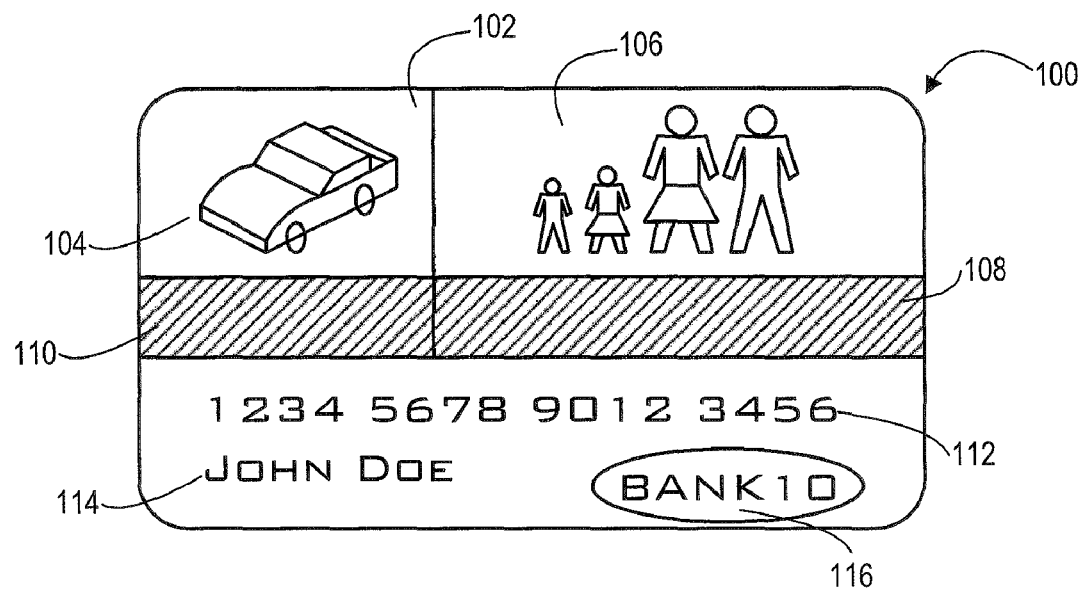
FIG. 1 shows a front side of one exemplary embodiment of a customized transactional card.
Figure 2:
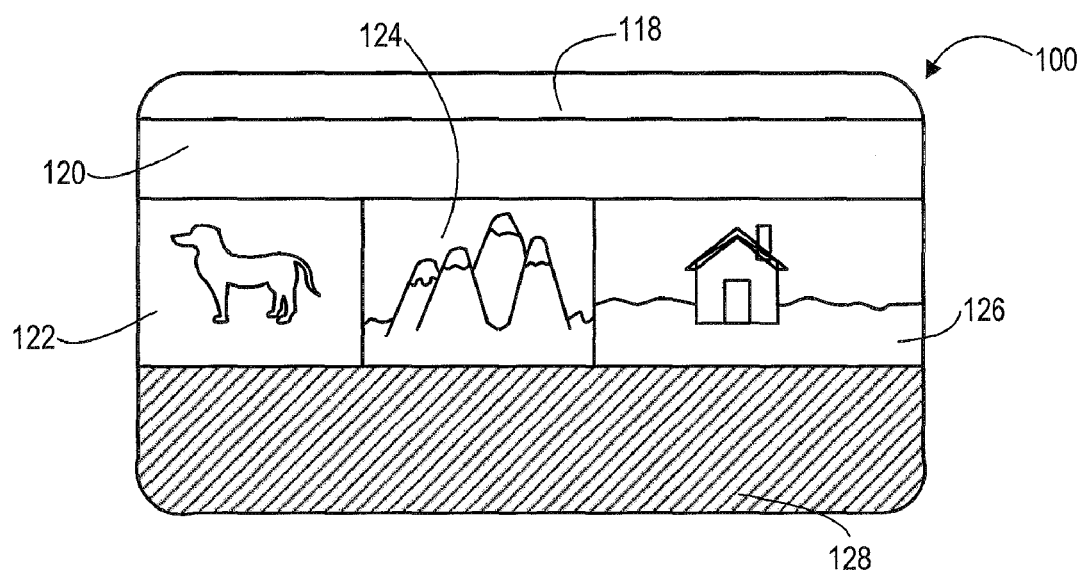
FIG. 2 shows a back side of one exemplary embodiment of a customized transactional card.

FIG. 1 shows a front side 102 of one embodiment of a transaction card 100 while FIG. 2 shows the back side 118. This embodiment includes a variety of customized design elements that are discussed below. However, it should be appreciated that the number of customized design elements that are present for various embodiments may differ from that shown in FIG. 1, and the embodiment of FIGS. 1-2 is shown only for purposes of illustration.

The transactional card 100 may contain materials found in conventional transactional cards using well known techniques and using well known materials for producing transactional cards. For example, the transactional card 100 may be constructed of plastic or other inorganic or organic materials including recycled materials and the like. According to one embodiment, the transactional card 100 has a machine-readable element 120, such as a strip located on the back side 118. The machine-readable element 120 may be one of various types, such as a magnetic strip, a bar code. The machine-readable element 120 may be of other forms as well, such as a radio frequency identification (RFID) tag or chip, or as discussed below may be a graphical image such as photograph that has information including the account number interspersed within it. At some point during the creation of the customized transactional card 100, an account number associated with the transactional card 100 is encoded on the machine-readable element 120 so that the account number can be acquired when the transactional card 100 is swiped or otherwise read at a card reader device. The account number 112 may also be provided visually on the front side 102 along with the name 114 of the card holder.

As shown, this particular embodiment includes various custom design elements on the front 102, such as images and heat sensitive color-changing coatings. In this example, the card holder has chosen to include an image 104 of an automobile and an image 106 of the family of the card holder. Images to be included may be chosen from stock images available from a design application being used by the card holder or the card holder may be given the option to upload specific photographs or other images that the card holder has available.

Furthermore, the customized design elements may include encoded glyphs and/or other information bearing effects such as that discussed in commonly assigned U.S.

patent application Ser. No. 11/022,531 entitled METHODS, SYSTEMS, AND COMPUTER PROGRAM PRODUCTS FOR PROVIDING PERSONALIZED, JUST-IN-TIME INFORMATION SERVICES, which is incorporated herein by reference. In this manner, the customization may include important and possibly time-sensitive information regarding the card holder in addition to merely ornamental effects. For example, medical or financial information and/or forms of identification may be included to increase the value of the transactional card to the user.

Additionally, according to one embodiment, a first heat sensitive color-changing coating 110 is located beneath the image 104 while a second heat sensitive color-changing coating 108 is located beneath the image 106. When the transactional card 100 is grasped by the card holder at either the coating 108 or 110, the coating 108 or 110 is heated and changes colors. Various different coatings may be applied to provide for different colors on the same transactional card. Such coatings may be provided for their entertainment value to card holders. Such coatings may also be provided for other purposes, such as to provide an alternative form of identification or verification of use of the card. For example, the merchant accepting the card may examine whether the color of the card indicates nervousness of the card holder and may infer that the card holder may not be an authorized user. Thus, the real card holder may select such coatings as an additional form of protection against unauthorized use of the card.

The front side 102 of this embodiment also includes a logo 116 of the card issuer. The logo 116 may be a custom design element that may be selected by the card holder. As discussed below, benefits may be provided to the card holder in exchange for selecting certain logos to include on the transactional card 100. Alternatively, the logo 116 of the card issuer may be mandatory such that blank cards issued to a card holder to allow the card holder to create the design may already have the logo in place. In another alternative, the design application being used by the card holder may require that the logo be included.

The back side 118 may also include custom design elements. In this example, the back side 118 includes an image 122 of a pet of the card holder, an image 124 of scenery chosen by the card holder, and an image 126 of the home of the card holder. In addition to images, the back side 118 of this example includes a coating 128 that is scented. Such a coating 128 may be activated by heat or other forms of agitation such that the scent is provided in response to the card holder grasping or otherwise agitating the coating 128. Examples of scents include flowers, food, and the like.

Figure 3:
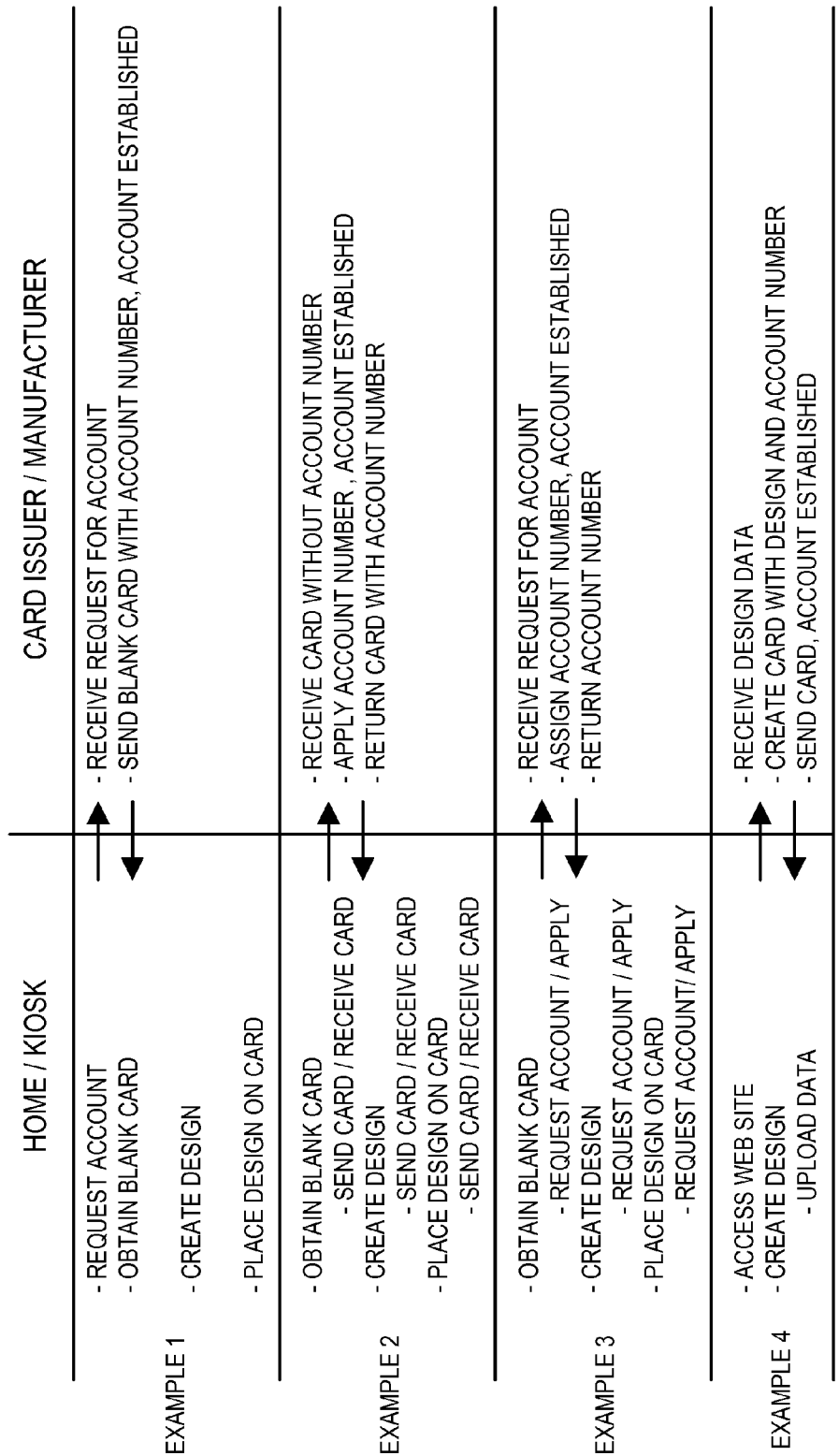
FIG. 3 is a chart of illustrative examples for creating customized transactional cards.
Figure 4:
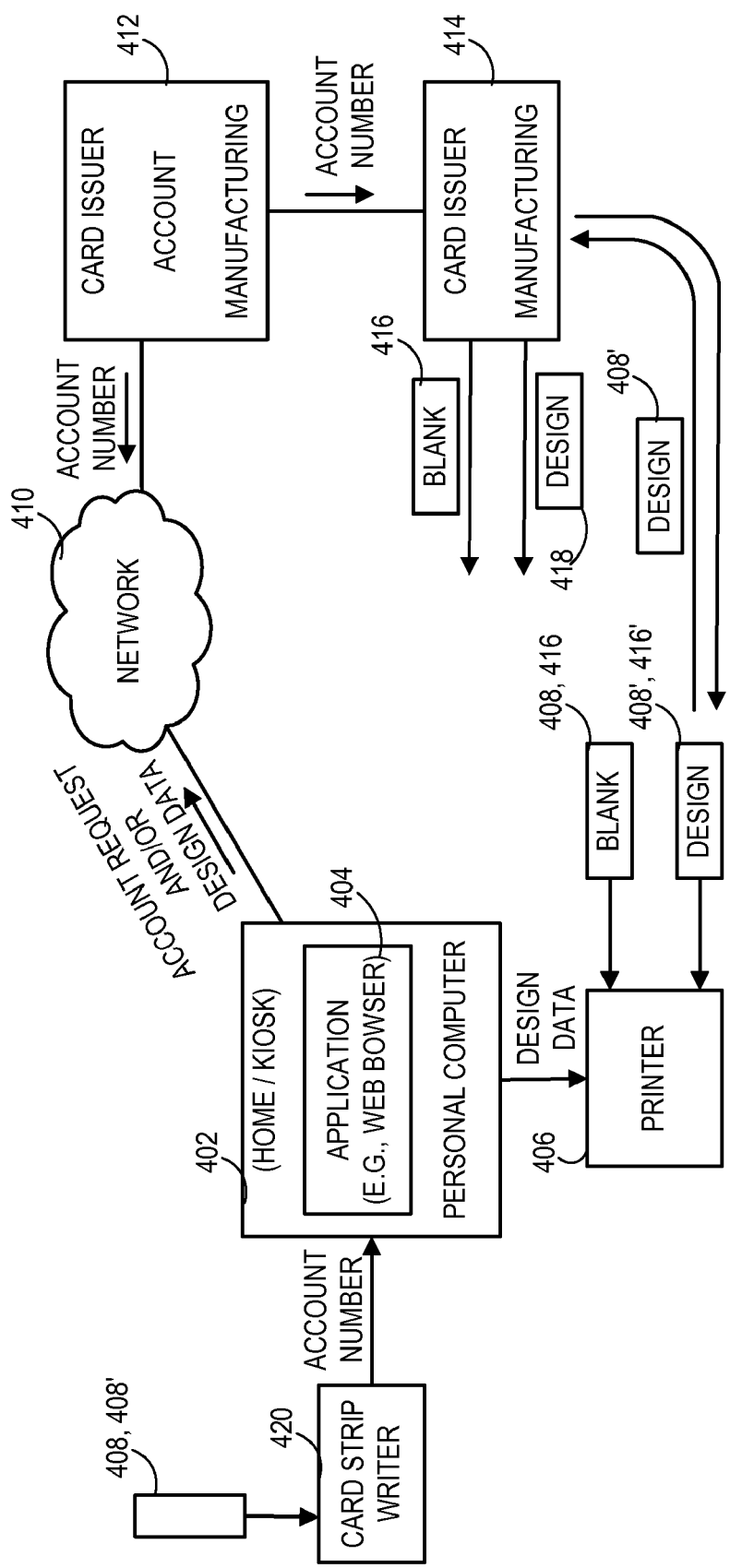
FIG. 4 shows various components used for various exemplary embodiments of creating customized transactional cards.

FIG. 3 shows a chart that includes several illustrative embodiments of methods for creating a customized transactional card. FIG. 4 shows an example of the components that are used in the embodiments of FIG. 3 when creating the customized transactional card.

In Example 1, the card holder obtains a transactional card 416 that is at least partially blank where the blank portion is intended for receiving a custom design. In this example, the transactional card is manufactured at a card issuer manufacturing facility 414 and is sent to the card holder by the card issuer, such as in response to the card holder requesting an account that has an associated transactional card. Prior to sending the transactional card to the card holder, the card issuer manufacturing facility 414 has encoded the transactional card with an account number that has been assigned by a card issuer account administration facility 412 which has established the account associated with the account number.

The account number may be present on the transactional card such as by encoding the number within a machine-readable element on the transactional card. For example, the account number may be magnetically encoded on a magnetic strip, visually encoded within a bar code, or encoded into an RFID tag or chip. Furthermore, the account number and/or other information may be present within graphical representations, such as embedded or interspersed within the pixel rows and columns of images, e.g. within image 106, that are present on the transactional card by default or by the selection of the card holder. For the utmost in security, the user may choose to have the account number not be present in the form of visual characters so that the account number can only be obtained from the machine-readable element. Accordingly, unauthorized individuals cannot simply read the number from the card and then use it to make an on-line or telephone purchase.

Figure 5:
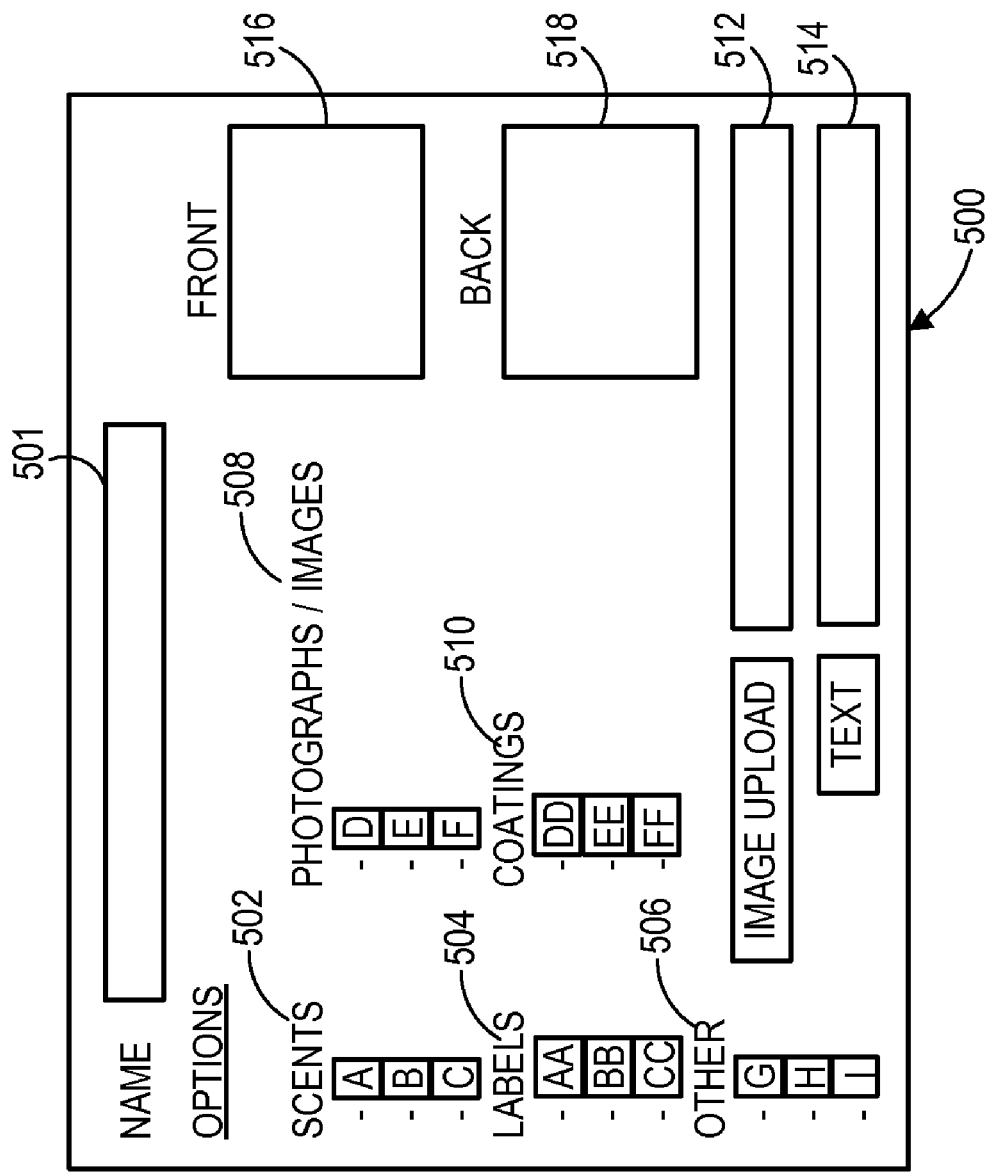
FIG. 5 shows an example of a web page for receiving user input to create a customized card.

In this Example 1, upon the card holder receiving the transactional card 416, the transactional card 416 is already ready to be used but lacks the custom design. The card holder then utilizes, for example, a computer application 404 on a personal computer 402 to generate the design. For example, the computer application 404 may be a local application being implemented by the personal computer 402 or may be a web browser that has loaded a web page that provides card design tools, as shown in FIG. 5 discussed below. The card holder may be using the personal computer 402 directly, such as at the home of the card holder, or may be using the personal computer 402 indirectly, such as by directing a representative of the card issuer located at a kiosk or service bureau who is using the personal computer 402.

The application 404 may provide the card holder with many options for the customized design. For example there may be a variety of stock images to be chosen. The size and location on the transactional card for each image may be selected. The application 404 may allow the card holder to upload custom images, such as personal photographs, graphical images, etc., to be included within the design. Furthermore, the application may allow for additional selections such as corporate logos to be included, coatings to be applied to provide for heat sensitive color-change and/or scents. Additionally, where the application 404 is a web browser accessing a publicly available web site for designing transactional cards, the web site may allow for the design to be saved or even published for selection by other card holders. Additionally, the application 404 or web site may provide credits or other benefits to the card holder where the card holder chooses certain logos to include in the design and/or if the design that is published by the card holder is chosen by other card holders.

Once the design has been completed within the application 404, the application 404 then sends the design to a card printer 406 or onto various media types including plastic and other organic or inorganic materials including recycled materials and the like. In the example shown, the card printer 406 may be a conventional laser or jet printer capable of receiving plastic or other cards as the input medium. Such a printer may be capable of printing gray scale or color, and may also be capable of printing coatings including heat sensitive coatings and scented coatings. Examples of such printers are described at http://www.plasticprinters.com/equipment, which is incorporated herein by reference.

Additionally, three-dimensional lithographic printing may be employed to build-up objects onto the card to further allow for customization via raised objects, characters, and so forth. For example, three-dimensional lithographic printing may be used to build-up the account characters and name of the account holder.

Prior to sending the design to the card printer 406, the blank card 416 has been fed to the printer 406. Once the design information is sent to the printer 406, the blank card 416 is then printed upon at least one side to apply the custom design and thereby output custom card 416'. If there is a custom design for both sides of the card 416 and the printer 406 is only capable of printing one side at a time, then the card 416' may be fed back to the printer but oriented in the opposite manner so that the design for the opposite side can be applied. Once the printing is finished, the custom transactional card is ready for use by the card holder.

As an alternative, the transactional card 416 may be capable of receiving a label that is placed over the blank portion, where the label is sent through the printer rather than the complete card so that virtually any printer is capable of creating the customized design. Once the label has been fed to the printer 406, the application 404 sends the design to the printer 406 to place the design on the label. The label is then applied to the appropriate side of the blank transactional card 416 to create the customized transactional card 416'. The blank transactional card 416 may have a specific area that is delineated so that the card holder can easily determine where the label should be placed.

Furthermore, scented and/or heat sensitive labels may be applied to the card. Examples and/or details for such scented labels may be found at http://www.printmeprim.com/store/WsDefault.asp?Cat=ScentLabels, http://www.aero.si/ps/prom_tix.htm, http://www.paperspecs.com/resources/tips/200561516195.htm, http://www.microscent.com, each of which is incorporated herein by reference. Examples and/or details for such heat sensitive labels may be found at http://www.drypak.com/index.asp?cat-62759 and http://www.futurehealth.org/stressma.htm, each of which is incorporated by reference.

Additionally, custom stickers may be generated to place on the card. Such stickers may be temporary in that they can be removed and replaced as desired. In this manner, the user may update the same card from time to time with a new sticker design. Additionally, where time-sensitive information is to be included on the card in accordance with the principles disclosed in U.S. Application Ser. No. 11/022,531, this time-sensitive information may be included on a sticker so that the time-sensitive information maybe easily updated In Example 2, the card holder obtains a blank card 408 such as from a third party supplier or at a kiosk of the card issuer. In this example, no account number is yet assigned to the transactional card 408. At some point prior to the card holder first using the transactional card 408, the card holder sends the transactional card 408 to the card issuer where an account number is assigned to and encoded upon the transactional card and an associated account is established. The transactional card 408 is then returned to the card holder.

Either before or after sending the transactional card 408 to the card issuer, the card holder may create a design using the application 404 and then may place the design onto the transactional card 408 by feeding the transactional card 408 or a label to the printer 406 and initiating printing of the design from the application 404 to produce the customized transactional card 408'. If the customized designed is applied first, then it is the customized transactional card 408' that is ultimately sent to the card issuer, where the manufacturing facility 414 then encodes the account number onto the transactional card 408' based on the account number provided form the account administration facility 412 prior to returning the transactional card 408' to the card holder.

In Example 3, the card holder obtains a blank card 408 such as from a third party supplier or at a kiosk of the card issuer. In this example, no account number is yet assigned to the transactional card 408. The card holder at some point submits a request for an account to the card issuer. The card issuer account administration facility 412 receives the request and then returns an account number and establishes an account associated with the account number.

The request for and return of the account number may be done via secure communications through the network 410 by the card issuer account administration facility 412 interacting with the application 404. In that case, either before, during, or after printing of the design that the card holder has created via the application 404, the application 404 may also direct the printer 406 to print a machine-readable bar code that encodes the account number. Alternatively, where the personal computer 402 is in communication with a card strip writer 420, which is more likely in the context of a card issuer kiosk or service bureau, the account number may be encoded upon a magnetic strip of the blank transactional card 408 or customized transactional card 408'. Likewise, the account number may be encoded into an RFID chip or tag.

In Example 4, the card holder does not obtain a blank card but instead accesses an application, such as a web site within a browser, that allows for customized design creation for transactional cards. The card holder creates the design within the application, which may allow the card holder to upload data files including photographic and graphical images. The card holder may upload this data, e.g., at a website. Alternatively, the card holder may send the customized data via email, regular mail, etc. Upon having received the customized design data, the card issuer then proceeds to create the customized transactional card in accordance with the design data at the manufacturing facility 414, including providing an account number received from the account administration facility 412 and encoding it upon the customized transactional card 418. As an alternative, a third party entity may receive the transactional card from the card issuer and apply the customization indicated by the card holder. The customized transactional card 418 is then sent to the card holder.

As shown in FIG. 5, a user may log on to a web page 500 of a card issuer or card manufacturer. The user may enter the card holder's name in a name field 501. The web page 500 may offer various categories of options that the user may select from to mix and match design elements as desired. For example, a "Scents" option 502 provides various scents from which the user can choose. A "Labels" option 504 provides various labels to add to the card, such as heat sensitive and/or scented labels, and "Other" option 506 may provide for other options, such as options for more sophisticated cards that have circuitry for storing sound effects, lighting effects, and so forth. "Photographs/Images" option 508 may provide for selection of stock photographs, images, corporate logos, and the like while "Coatings" option 510 may provide for selection of various coatings to be applied to the card.

In order for the user to further add customization, image field 512 and text field 514 may be provided. The user may enter a path to an image file via image field 512. For example, the user may have one or more images stored locally and may wish to upload those to the web page for inclusion on the card. The user may directly type in text to add to the card via text field 514 and then position that block of text in the desired location on side 516 or 518.

The card may be illustrated as the front side 516 and back side 518 on the web page 500, and the user may drag and drop options such as the scents to the chosen side and particular location where the effect is to be located. The illustrations 516, 518 may provide a visual preview of the card as the user continues to select options and review the result. The user may be given the option to undo effects or to reposition effects such as by dragging and dropping the effects visually represented on the sides 516, 518.

Thus, through the various exemplary embodiments discussed herein, account holders are given the ability to create customized transactional cards. An account holder may prefer to customize the transactional card rather than using a standard design. Accordingly, the account holder may be more likely to establish an account such as a credit or pre-paid account with an account issuer who allows customized transactional cards.

While the invention has been particularly shown and described with reference to various exemplary embodiments thereof, it will be understood by those skilled in the art that various other changes in the form and details may be made therein without departing from the spirit and scope of the invention.

What is claimed is:

1. A method of creating a customized transactional card, comprising:
    receiving data files from a card holder, the data files containing customized design features selected by the card holder, wherein the data files are received via a website, and the selected design features are saved via the website as a design option for selection from the website by other card holders;
    constructing the transactional card in accordance with the selected design features; and
    providing a machine-readable element having account information present on the transactional card.

2. The method of claim 1, wherein the design features include at least one of images and scents.

3. The method of claim 1, wherein the data file is an image file.

* * * * *